United States Patent [19]

Feistel

[11] 4,316,055
[45] Feb. 16, 1982

[54] STREAM/BLOCK CIPHER CRYTOGRAPHIC SYSTEM

[75] Inventor: Horst Feistel, Mount Kisco, N.Y.

[73] Assignee: International Business Machines Corporation, Armonk, N.Y.

[21] Appl. No.: 755,898

[22] Filed: Dec. 30, 1976

[51] Int. Cl.³ .............................................. H04L 9/00
[52] U.S. Cl. ............................ 178/22.06; 178/22.05; 178/22.13
[58] Field of Search ........................................ 178/22

[56] References Cited

U.S. PATENT DOCUMENTS

| | | | |
|---|---|---|---|
| 3,657,699 | 4/1972 | Rocher et al. | 178/22 |
| 3,798,360 | 3/1974 | Feistel | 178/22 |
| 3,958,081 | 5/1976 | Ehrsam et al. | 178/22 |

Primary Examiner—Howard A. Birmiel
Attorney, Agent, or Firm—Roy R. Schlemmer, Jr.

[57] ABSTRACT

The system disclosed comprises a dual function cryptographic system capable of operating in either a stream or block cipher mode. Further, with minimal alteration the system is capable of performing either encoding or decoding functions. The system requires three inputs, the first of which is the raw data, and the second two inputs comprise a first and a second unique user supplied key. One of the keys is utilized to control a permutation function for both the stream and block cipher mode and the other key is combined directly with the data in the block cipher mode prior to a series of nonlinear transformations. In the stream encipherment mode of operation the second key is entered in its entirety into the system where it is successively and continuously transformed as a function of said first key whereby the function of said system becomes a pseudorandom number generator whose output is serially combined with the raw data to form the stream enciphered cryptogram.

14 Claims, 5 Drawing Figures

* CONCURRENT INPUT AND OUTPUT

STREAM/BLOCK CIPHER CRYTOGRAPHIC SYSTEM

BACKGROUND OF THE INVENTION

There is an increasing need in modern industry for data privacy and/or security. In the communications field, data being transmitted via radio communication or telephone lines is susceptible of interception and unauthorized use or alteration. In the computer industry unauthorized access to data may be obtained, for example, by accessing various storage devices or intercepting messages being transmitted between terminals or between the terminals and the host of remote-access computer networks. In such networks a large number of subscribers are provided access to "data banks" for receiving, storing, processing and furnishing information of a confidential nature. The need for data security in such systems cannot be too highly emphasized.

Generally, present-day computing centers have elaborate procedures for maintaining physical security at the location where the central processor and data-storage facilities are located. For example, some of the procedures which have been used are: restrictions of personnel within the computer center, utilization of mechanical keys for activation of equipment, and camera surveillance. These security procedures, while providing a measure of safety in keeping unauthorized individuals from the physical computing center itself, are not effective with respect to large remote-access computer networks which have many terminals located at distant sites, connected to the central processor by either cable or telecommunication lines.

Some digital techniques have been implemented in computing systems for the purpose of maintaining privacy of data. One such approach is the use of a device generally known as "memory protection". This type of data security technique associates a unique binary key with selected segments of the storage within the central processor. Then, internal to the processor, there are present various protection circuits that check for a match of the binary key during the operation of executable instructions and accesses to sections of storage. This type of security measure is generally ineffective in protecting information within the computing system from unauthorized individuals who have knowledge of the computing system circuitry, and who can devise sophisticated programming techniques for illegally obtaining unauthorized access to data.

In the field of communications, cryptography has long been recognized as a means for achieving security and privacy. Many systems have been developed in the prior art for encrypting messages for maintaining secrecy of communications. For example, one well-known technique which has been used for generating "ciphertext" from "cleartext" messages is that of substitution. In systems which utilize substitution, letters or symbols that comprise the clear message are replaced by some other symbols in accordance with a predetermined "key". The resulting substituted message is a cipher which is expected to be secret and hopefully cannot be understood without the knowledge of the secret key. A particular advantage of substitution in accordance with a prescribed key is that the deciphering operation is easily implemented by reverse application of the key. A common implementation of substitution techniques may be found in ciphering-wheel devices, for example, those disclosed in U.S. Pat. Nos. 2,964,856 and 2,984,700, filed Mar. 10, 1941 and Sept. 22, 1944 respectively.

Further teachings on the design principles of more advanced substitution techniques may be found in "Communication Theory of Secrecy Devices" by C. E. Shannon, Bell System Technical Journal, Vol. 28, Pages 656-715, October 1949. Shannon, in his paper, presents further developments in the art of cryptography for expounding the product cipher, that is, the successive application of two or more distinctly different kinds of message-symbol transformations. One example of a product cipher consists of a symbol substitution followed by a symbol transposition.

Still another well-known technique for enciphering a clear message communication is the use of a stream-generator sequence which is utilized to form a modulo sum with the symbols that comprise the clear message. The cipher output message stream formed by the modulo sum would then be unintelligible to the receiver of the message, if it does not have knowledge of the stream-generator sequence. Examples of such stream-generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear message with a key-material generator that controls the number of cycles for enciphering and deciphering. Related to this patent is U.S. Pat. No. 3,506,783 filed June 12, 1967 which discloses a means for generating the key-material which gives a very long pseudo-random sequence.

Another approach which has been utilized in the prior art for establishing secret communications is the coding of the message's electrical signal representations that are transmitted over the communications channel. This type of technique is usually more useful in preventing jamming rather than in preventing a cryptanalyst from understanding a cipher message. Exemplary systems of this type may be found in U.S. Pat. Nos. 3,411,089, filed June 28, 1962 and 3,188,390, filed June 8, 1965.

In the area of computer data communications, it has generally been found that product ciphers are superior to any other types of ciphering schemes, as discussed in "Cryptography and Computer Privacy" by H. Feistel, Scientific American, Volume 228, No. 5, May 1973, pp. 15-23. Examples of product ciphering systems are disclosed in the two previously referenced U.S. Pat. Nos. 3,798,359, and 3,796,830, as well as the copending application Ser. No. 552,685. These patent references disclose systems for generating a product cipher under the control of a unique user key. With careful selection of the size of the data block and the key size, the probability of ever cracking or breaking the cipher becomes extremely small. That is, a cipher becomes impractical to crack by trial of all possible combinations of the key. This is particularly true if the ciphertext reveals no information with regard to the unique user key.

The previously referenced block cipher cryptographic systems, especially those utilizing the non-affine transformation of substitution, may be utilized to produce extremely secure ciphers. However, the price which one must pay to produce such a cipher with these systems is the iteration or repetition of the encipherment process a plurality of times.

Conversely, as stated previously with the stream-cipher systems utilizing some sort of a stream-generator, either the complete random number stream or key must be known at both the sending and receiving ends or alternatively some form of known psuedo-random number generator must be used. It is generally considered impractical to have a complete secret random number key. Accordingly, when stream encipherment is to be accomplished the prior art normally utilizes some sort of pseudo-random number generator. The primary advantage of stream encipherment is its speed, i.e., the message is flowed serially through the system and the data stream combined in a known transformation with the random number generator as by a modulo-2 addition which may be repeated at the other end for decryption with maximum speed. The price one must pay for this speed of course is some lack of ultimate security.

However, in many communication and/or closely related computer systems where differing security levels exist, it would be a great advantage to be able to utilize full block ciphering techniques for highly secure data transmissions and stream enciphering techniques for data transmissions having a requirement of lower security.

An example of such a system might be in a cash issuing or banking terminal wherein the personal identification of the person seeking to obtain money or credit must be of the highest security to insure proper identification while the actual data message transmission could be at a lower level of security, but wherein some security or secrecy might be desired to maintain the integrity of the data being transmitted.

It would further be most advantageous to have a single hardware system capable of selectively performing stream or block encipherment with essentially the same hardware and an abosolute minimum of alteration of said hardware between encipherment modes and between encipherment and decipherment.

SUMMARY AND OBJECTS OF THE INVENTION

It has now been found that a single composite hardware device may be provided for selectively performing the tasks of stream-encipherment or block encipherment by setting an input mode key of the system, loading two unique user supplied keys, and finally entering data, whether clear-text or ciphertext, into the system. Further, by the additional expedient of setting an encrypt/decrypt switch, the same hardware may be utilized for either encryption or decryption of a message providing, of course, that the same keys and appropriate input data stream is available. While the detailed operation of the two modes of encipherment vary considerably, both utilize the common functions of consecutive encryption operations in a shift register, including passing a predetermined portion of the contents of the shift register through a transformation element which includes the functions of non-affine transformation and a linear transformation combined additionally with permutation. The resultant cryptographic system is thus capable of providing either a very secure block cipher cryptogram or a much faster but somewhat less secure stream cipher cryptogram utilizing the system as a psuedo-random number generator.

It is a primary object of the present invention to provide a key-controlled cryptographic system capable of being utilized selectively in the stream cipher or block cipher mode.

It is a still further object of the invention to provide such a system which utilizes substantially the same cryptographic hardware for both modes of operation.

It is yet another object of the invention to provide such a system which includes the non-affine transformation of substitution, linear transformations and a key-controlled linear permutation operation for both modes of operation of the system.

It is yet another object of the present invention to provide such a cryptographic system where, in one case, the output of said system is a block cipher cryptogram and in the stream mode the output comprises a sequential psuedo-random number stream.

Other objects, features and advantages of the present invention will be apparent from the following description of the preferred embodiment of the system.

DESCRIPTION OF THE DRAWINGS

FIG. 2 comprises an organizational drawing for FIGS. 2A and 2B.

DESCRIPTION OF THE DISCLOSED EMBODIMENT

The objects of the present invention are accomplished in general by a combination stream/block cipher cryptographic system comprising the following means actuable for during both string and block cipher operations, means for storing a user supplied key, means for entering data into said system, and a main reconfiguration means both whose input and output is a function of said user supplied key, a transformation element connected to said main reconfiguration means for extracting and transforming data from a predetermined area of said main reconfiguration means and returning said transformed data to said main reconfiguration means at a predetermined location therein. Control means are provided for cycling said reconfiguration means a predetermined number of times to produce a cryptographic output stream which is a complex function of said user supplied key and the data stream input into said system.

A further level of cryptographic security is introduced to the system by utilizing said user supplied key and controlling the transformation element means as a function of said user supplied key. Said transformation element further includes both the non-affine transformation operations of substitution and a linear transformation means such as a modulo-2 addition element. Additionally, a convolution element or transposition means is included in said element which operates under control of said user supplied key.

All of the aforementioned instrumentalities are utilized in both the block and stream encipherment modes of operation of the presently disclosed system. When operating in the stream mode, the hardware functions primarily as psuedo-random key generator, which is combined serially with the input data stream in a modulo-2 adder.

Figure 1:
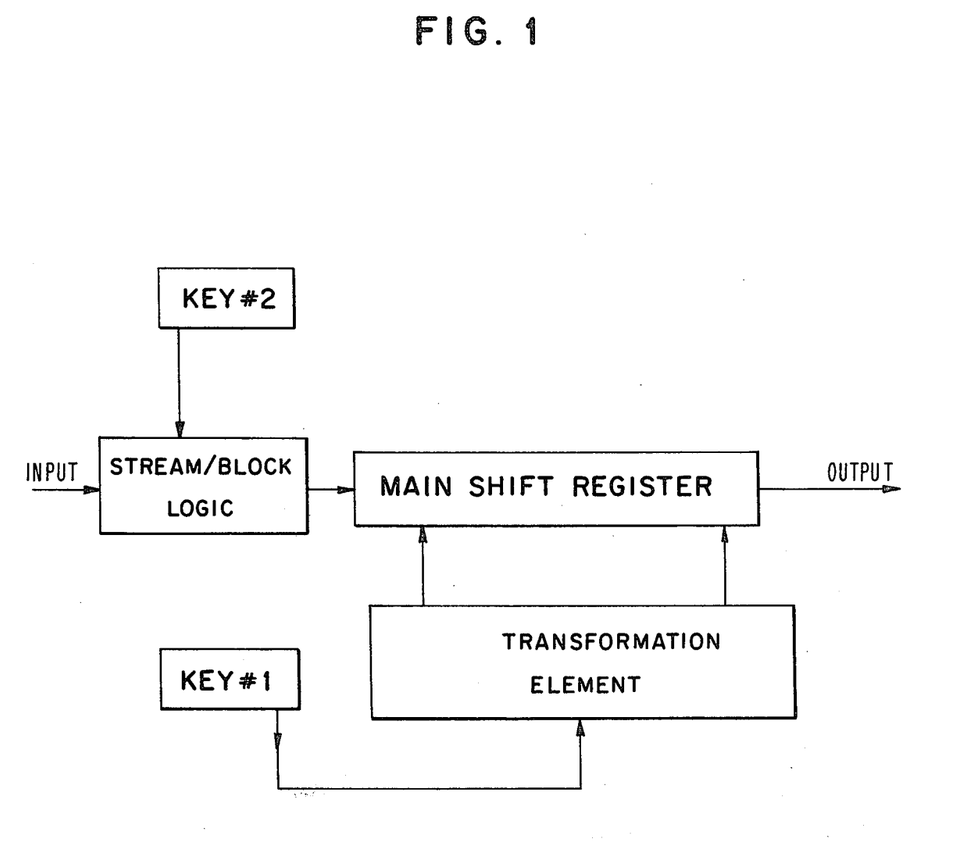
FIG. 1 comprises a functional block diagram of the Stream/Block cipher cryptographic system of the present invention.

FIG. 1 is a broad functional block diagram of the present system and clearly shows the primary functional components thereof. The following description will relate generally to this figure. When operating in the block cipher mode, blocks of data are sequentially loaded into the main reconfiguration means which in the present embodiment is the Main Shift Register, the loading of said block is a function of one of said two user supplied keys (Key #2 in the FIG.). Subsequent to the loading operation, the contents of the Main Shift Register are reconfigured a predetermined number of times in combination with certain cryptographic transformation functions performed by the Transformation Element, shown in FIG. 1. Upon completion of said predetermined number of transformations the contents of the Main Shift Register (MSR) are gated directly out of the system as the enciphered or deciphered block of data.

Still referring to FIG. 1, it will be noted that the block marked Key 1 feeds into the Transformation Element. As will be explained subsequently, the Transformation Element includes a convolution or transposition operation which is performed under control of the user supplied key stored in the block labeled Key 1.

The block labeled Key #2 feeds into the block labeled Stream/Block Logic since this user supplied key is utilized during both stream and block cipher modes as described above and is initially involved in loading the MSR during both operation modes. As will be apparent from the subsequent detailed description of the algorithm, Key 2 is loaded directly into Main Shift Register during stream mode operations. During block mode operations the loading of Key 2 is somewhat more complex in that it is combined with the data bit-wise as the Main Shift Register is loaded initially during a block mode operation during encipherment but is combined with the output of said Main Shift Register during decipherment operations as a final step. The necessity for this will similarly be more readily apparent from the subsequent description of the operations of the system.

It will be apparent from the previous general description of the system that the presently disclosed cryptographic system utilizes identical hardware instrumentalities for selectively performing encryption utilizing stream mode techniques or block mode techniques. Similarly, the same hardware is mathematically or cryptographically reversible in that the same hardware performs both encryption and decryption upon the setting of appropriate mode control switches in the input section as will be explained subsequently.

FIG. 1 thus shows the functional units that are used in both modes of operation, however, none of the control circuitry is shown or suggested in FIG. 1. The differences in the actual operation of the system when in stream or block cipher mode will be clear from the following description of the detailed embodiment of FIGS. 2A and 2B and also from the following description of the flowcharts of FIGS. 3 and 4, which, together with the following 'operational sequence' charts, very clearly specify the operation of each and every segment of the present system during both stream and block cipher operations.

As will be remembered, the present hardware system initially loads what has been shown as user supplied key-2 into the Main Shift Register and the overall system operates essentially as a psuedo-random number generator, wherein the contents of the Main Shift Register are continuously altered by the Transformation Element utilizing the operations of substitution, permutation or transposition as well as modulo-2 addition to produce the aforesaid psuedo-random number stream. Each time the Main Shift Register is shifted one bit position, as will be apparent from the following description, there is an output bit which is modulo-2 added to a bit of the data stream regardless of of whether said data stream is being enciphered or deciphered.

Stated very generally the system operates in the following way in block mode. A block of data to be enciphered or deciphered, of a size determined by the size of the MSR, is combined with the user supplied key-2 and loaded into the Main Shift Register. Upon completion of the leading operation, the shift register is then cycled a predetermined number of times, said convolutions taking place through or in combination with the Transformation Element, under control of the main system control. Once the complete transformation process within MSR is completed, the complete block of data is ready to be sent out on the system as either encoded or decoded. It will be noted in the subsequent description that as one block of data is shifted out of the MSR a new block is automatically shifted in to save operation time.

Before proceeding with the specific detailed description of the flowchart and operational sequence charts, reference will first be made generally to FIG. 2, which is an organizational drawing showing the organization of FIGS. 2A and 2B, which in turn comprise a logical and functional schematic diagram of the essential hardware elements of the present cryptographic system. It is believed that all of the blocks shown in detail in the specific hardware embodiment of FIGS. 2A and 2B are well known in the computer arts and are essentially either off the shelf items or would be readily buildable by persons skilled in the art.

Figure 2A:
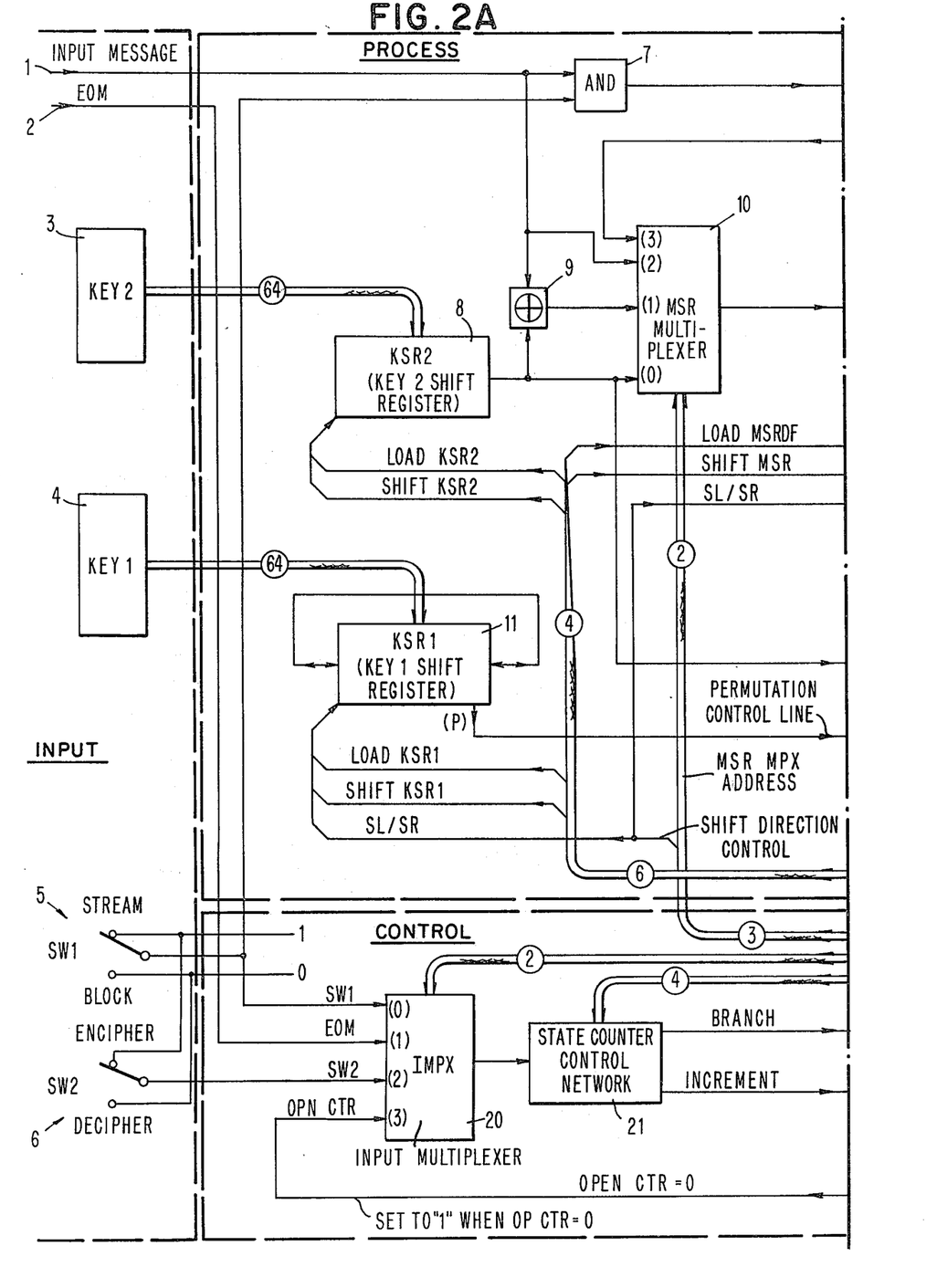
FIGS. 2A-2B comprise a composite block and functional schematic diagram of the present cryptographic system.
Figure 2B:
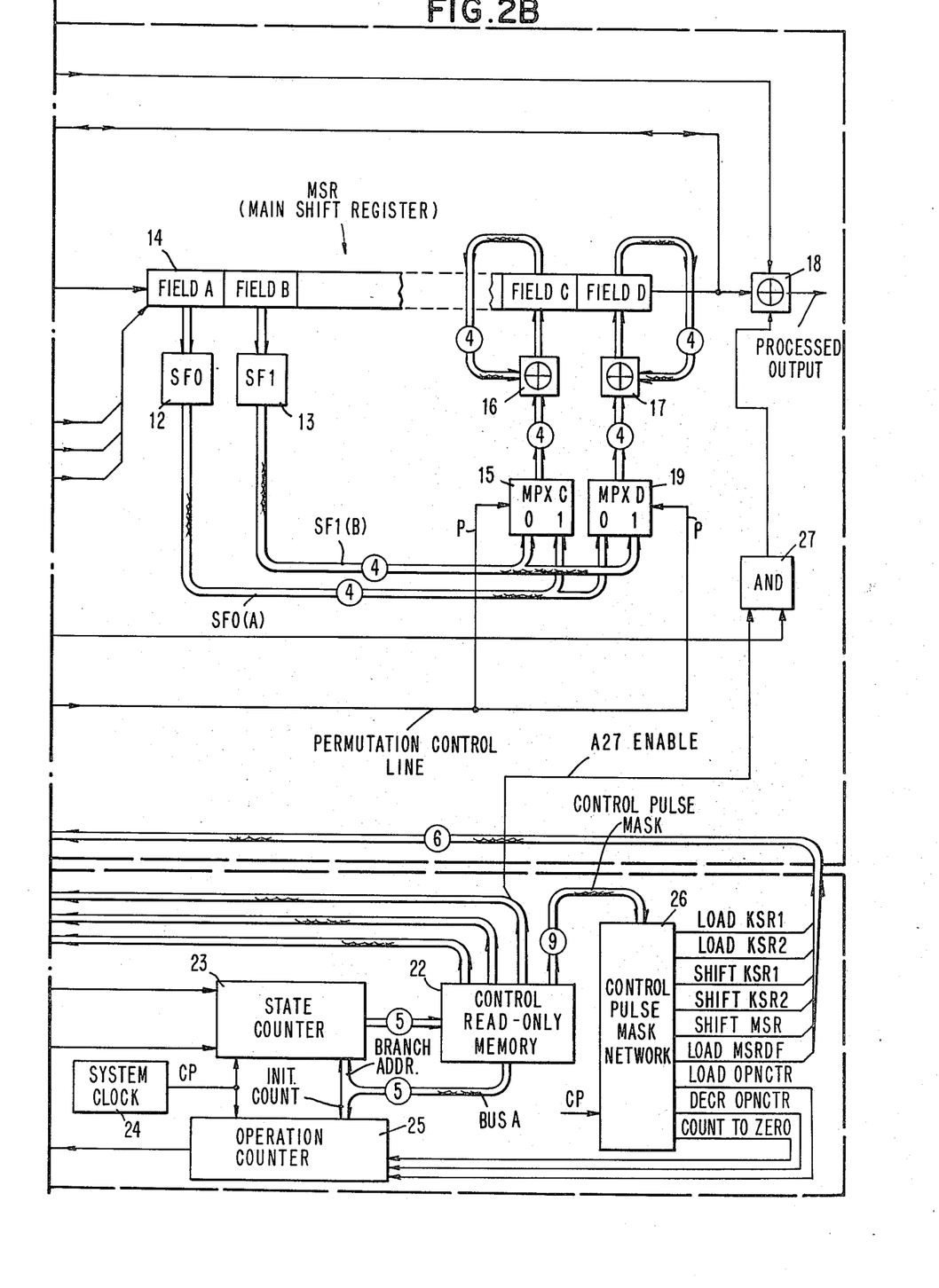

It will be noticed in referring to FIGS. 2A and 2B, (which will be referred to as simply FIG. 2 in the future for convenience) that there are three separate sections of the system separated by dotted lines and designated in Input, Process, and Control. These are the three essential subsystems which comprise the overall hardware system.

A. Input Subsystem

The input subsystem comprises facilities for the inputting of message signals, keys, and mode control commands.

The message signal section consists of two input lines: the Input Message Stream line 1 which receives the bit-serial message to be processed; and, the End of Message (EOM) line 2, which receives a signal to indicate the starting and ending points of the message stream and is utilized to synchronize system operation.

Two key input ports, for Key 1 and Key 2, storage means 3 and 4 make up the key section. Keys 1 and 2 are used in both stream and block modes and are each 64 bits wide.

Loading of keys into their respective key shift registers, KSR1(11) and KSR2(8), is effected by parallel loading under direction of the control subsystem.

Mode control commands are input to the system via two operator-controlled selector switches, SW1(5) and SW2(6). Switch SW1 allows the operator to select either block or stream mode of system operation. Switch SW2 enables the selection of the desired cryptographic operation, i.e., encipherment or decipherment of input message streams in the block mode. SW2 is not utilized when the system is operating in the stream mode; at such times, the setting of SW2 is irrelevant.

B. Process Subsystem

The process subsystem comprises a network of digital logic processing and storage elements organized to perform a number of required functions.

Key Shift Registers 11 and 8 for Keys 1 and 2 respectively each receive key data from their respective keys, Key 1 and Key 2, via a parallel load operation initiated by a "LOAD KSR1" or "LOAD KSR2" control pulse emitted by the Control Pulse Mask Network 26.

KSR1 (11) generates, under system control, the permutation control variable, P, which determines the permutation operations performed on operands stored in four-bit fields defined on the Main Shift Register (MSR) (14). KSR2 (8) receives Key 2(3) data in parallel and, in the stream mode, shifts said key data into the Main Shift Register (14) via the path through MSR Multiplexer (10). In the block mode, key data from KSR2 (8) are summed, modulo 2, with input data by Adder (9) and shifted into the Main Shift Register via a path through MSR Multiplexer (10).

Main Shift Register (14) is 64 bits in length and is arranged with two contiguous four-bit source fields, A and B, at the left and two similar destination fields, C and D, at the right. Between the pairs of fields are located the remaining 48 storage cells of said register.

Outputs from substitution transformation devices SF0 (12) and SF1 (13) (SF0(A) and SF1(B), respectively) are coupled to multiplexers MPXC (15) and MPXD (19) where, under control of the permutation control variable P, said outputs are steered to the appropriate destination field of the MSR (14) for Modulo 2 addition therewith.

The substitution devices shown as blocks 12 and 13 comprise essentially mapping tables or memories which take a 4 bit input and produces a 4 bit output depending upon the 4 bits in the Source Fields A and B. Thus, the 4 bits of the data byte going into the substitution device allow a selection of any one of 16 possible bit configurations in the 4 bit output from this substitution device. This substitution is considered a non-affine substitution in that there is no discernable logical relationship whatsoever between the data content of the 4 bit output and the data content of 4 bit input selection pattern. The addressing means for such a substitution device would be obvious to those skilled in the art, it being understood that the actual bit pattern configurations stored in the device are completely arbitrary and could be readily changed. However, it is obvious that for a given system to be able to decipher and encipher a particular message, the substitution device would have to be identical for both encryption and decryption operations.

It will be readily apparent that using more bits per substitution will increase the complexity of the operation as well as the security. Also one or more key bits could be utilized in the substitution, and appropriately combined with the data bits in making the substitution decision.

Table 1 summarizes the two conditions that may occur with respect to the permutation operations on the transformed source fields emanating from SF0(A) and SF1(B). If the permutation control variable, P, takes on the value zero, MPXC (15) will steer the output of SF1 (13) to Mod-2 Adder (16) where it will be summed with the current contents of destination field C. The sum will then replace the current contents of field C. Simultaneously, the current data in field D are replaced by the modulo-2 sum of said current data and the output of SF0 (12). If the permutation control variable takes on the value of one, the operations shown in the lower half of Table 1 are executed.

TABLE 1

$$P = 0 : \begin{cases} C \leftarrow C \oplus SF1(B) \\ D \leftarrow D \oplus SF0(A) \end{cases}$$

$$P = 1 : \begin{cases} C \leftarrow C \oplus SF0(A) \\ D \leftarrow D \oplus SF1(B) \end{cases}$$

where: $\oplus$ denotes mod-2 addition.

AND-gate 7 is enabled in the stream mode, via a control signal from switch SW1(5), and thereby gates the input message stream to adder 18 where said message stream is summed, modulo-2, with the pseudo-random binary bit-stream fed to Adder 18 from the Main Shift Register 14. The system output, i.e., the "Processed Output", is taken from the output of Adder 18.

In the block mode of system operation, AND-gate 7 is inhibited (by the zero-valued control signal from switch SW1(5)) from gating the input message stream to Adder 18. In this mode, the output of AND gate 7 takes on the value of zero and thereby causes Adder 18 to pass the signals from the Main Shift Register (14) to the "Processed Output" line without modification.

MSR Multiplexer 10 performs four functions under system control; (1) accepts input from KSR2 (8) in the stream mode to load the Main Shift Register (14) with Key 2 data; (2) accepts input from Adder (9) in the block mode to load the MSR (14) with the modulo-2 sum of input data and Key 2 data; (3) accepts input from Input Message Line (1) in the block mode to load the MSR (14) with input data for decipherment operations; and, (4) provides a bi-directional recirculation path around MSR (14) in both stream and block modes of system operation.

C. Control Subsystem

The control subsystem comprises a micro-programmed finite-state sequential controller which can monitor input signals and produce appropriate output signals to control the system hardware resources.

Within Control ROM 22 are stored bit patterns, organized as microwords, which when accessed in the appropriate sequence by the State Counter 23 determine the actions and/or status of system hardware resources in such a manner as to produce required signal processing operations in the process subsystem and appropriate sequences of output control signals and state transitions in the control subsystem.

State Counter 23 is controlled by the State Counter Control Network 21. The counter 23 can hold its current value, increment the current value by one, or branch to another value by parallel loading the State Counter with the branch address established on BUS A by a field in the Control ROM output microword.

State Counter Control Network (21) generates appropriate increment and branch control signals for the State Counter (23) as a function of: (a) the state transition control field in the Control ROM(22); and, (b) the input from Input Multiplexer (20) in those instances where a particular state transition is to be dependent upon external conditions.

Repetitive sequences of operations can be performed a specified number of times by means of the operations counter (25). An initial count may be loaded into the operations counter (via Bus A) from the Control ROM 22. By decrementing the operations counter 25 as part of an operational sequence and testing whether the count therein has reached zero (via input port (3) of Input Multiplexer (IMPX 20)), looping can be controlled as required.

Control Pulse Mask Network 26 enables the generation of one (or more) of the pulsed output control signals emanating therefrom. A mask of 9 bits from a field in the Control ROM 22 output microword enables (inhibits) specific output control signals when the associated bits in the mask are set to one (zero). Control pulses so generated are synchronized by the System Clock (24) output pulse, CP, shown entering the Control Pulse Mask Network (26) at the lower left.

Sustained, or level, control signals are derived directly from the Control ROM output microword. For example, the "MSR MPX ADDR" (address lines for the control of MSR Multiplexer (10)) and the "SL/SR" (shift direction control line for KSR1(11) and Main Shift Register (14)) are control signals that need to be maintained at a given value over many system clock cycles and hence are obtained from the Control ROM output microword.

AND-gate 27 is enabled (by "A27 ENABLE" from Control Read-Only Memory 22 in the block mode at the end of each decipher operation. It thereby causes the contents of the Main Shift Register 14 and Key Shift Register 2 (8) to take place in the modulo-2 adder (18).

Detailed Description of the Flow Charts

Figure 3:
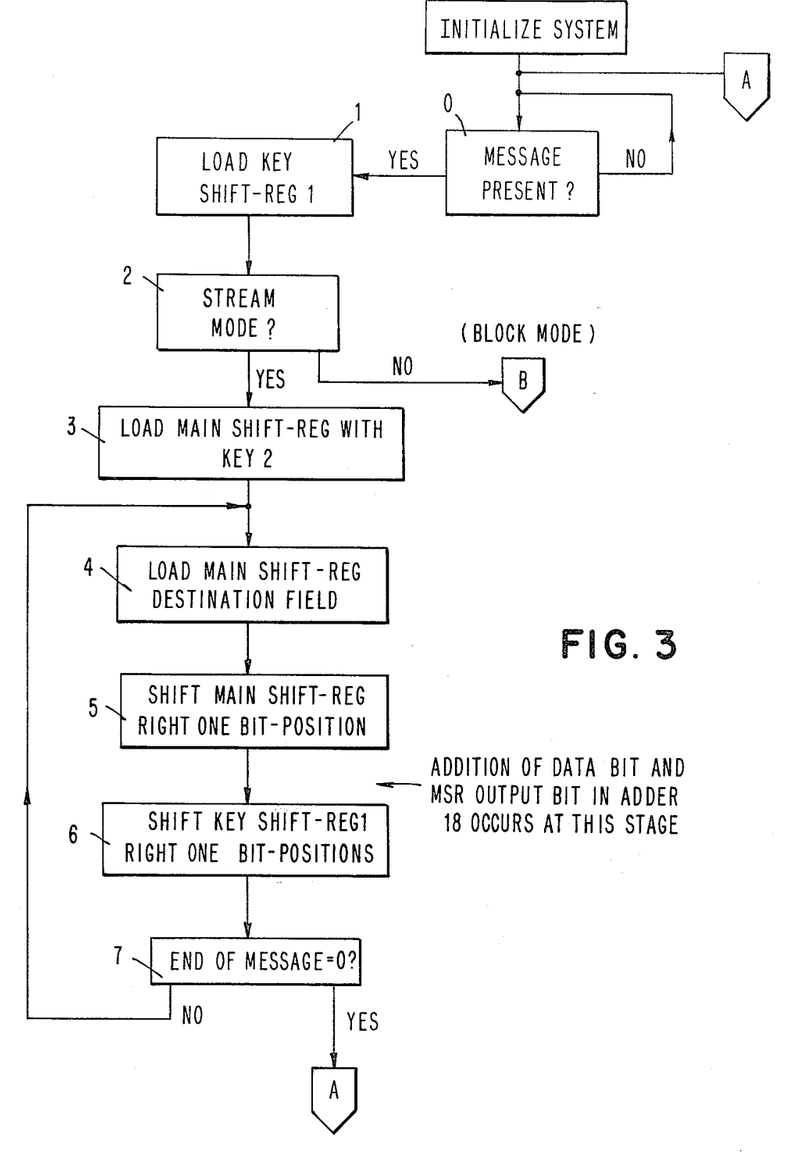
FIG. 3 is a flowchart of the initialization phase of the present system together with the specific details of the stream-encipherment mode.
Figure 4:
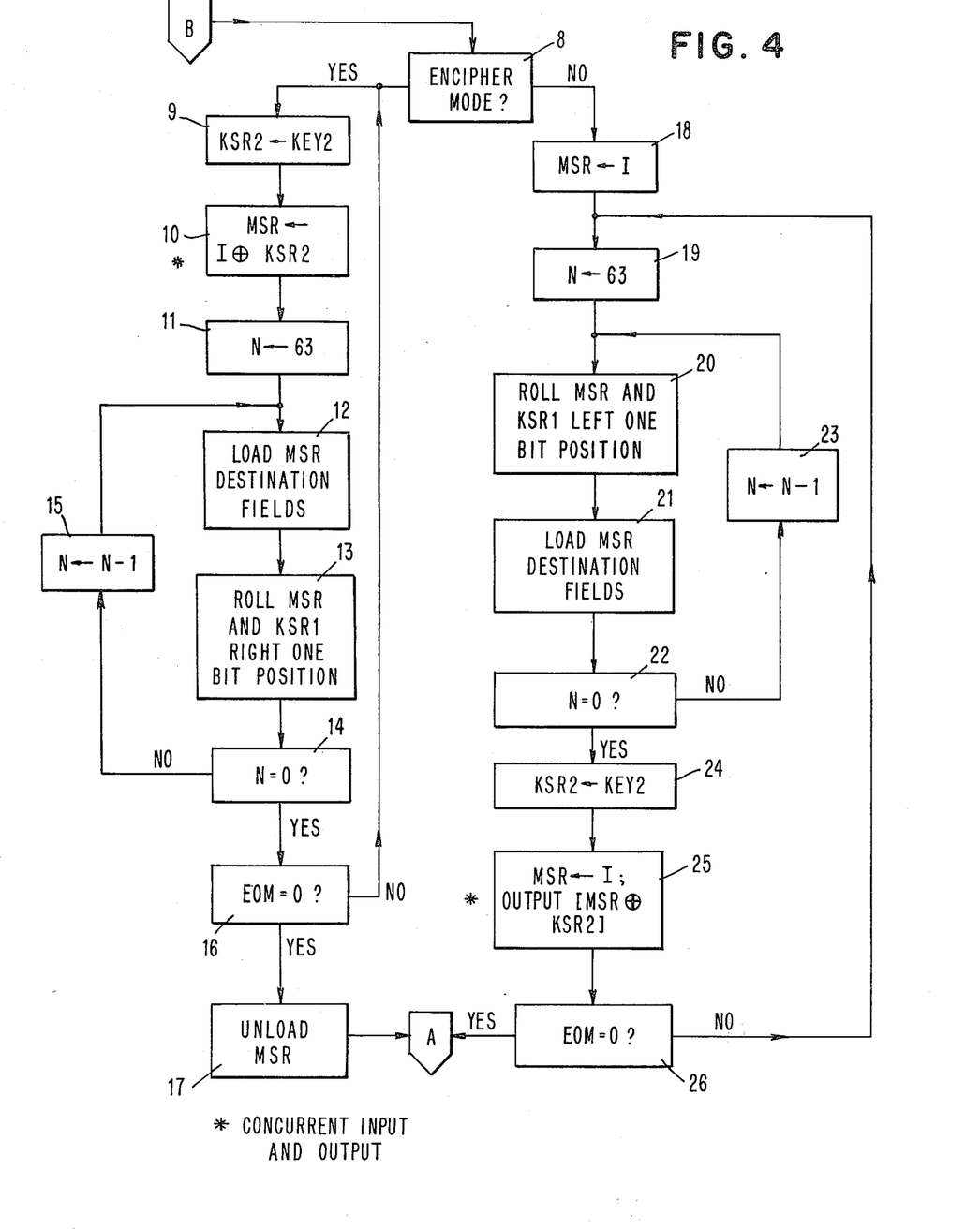
FIG. 4 is a flowchart of the operation of the block encipherment mode of the present system.

Before proceeding with a detailed description of the operation of this system with respect to the flow charts and operational sequence charts it should first be noted generally in FIG. 3 that the first blocks, i.e., 0,1, and 2, comprise a series of three common operations that occur regardless of the mode of operation and it is only on the exit from block 2 that a decision is made as to whether or not the system is in stream or block mode. The remainder of FIG. 3 as is apparent is devoted to the operations which occur during stream mode. Similarly, FIG. 4 takes off at point B in the flow chart of FIG. 3, and thus FIG. 4 is the flow chart of block mode operation. It will be noted that only key-1 shift register 11 is loaded during the generalized portion of the system operations as it is used identically in either mode, however, key-2 is utilized somewhat differently in the block mode, and therefore must be loaded separately as shown on FIG. 4. Key-2 is shown to be loaded in blocks 9 and 24 respectively on FIG. 4 depending upon whether the system is in encipher or decipher mode.

The operation of the system will now be described in detail with respect to the operational sequence charts, it being noted that first FIG. 3 will be described and then FIG. 4. Referring briefly to the operational sequence charts appearing subsequently in the specification to the present description, each of these charts contains two columns. The left-hand column labeled Flow Chart Label is the actual block number used in the flow charts of FIGS. 3 and 4 during which the specific operations called for in the operational sequence charts are performed. It will be noted that some blocks require only one specific hardware control function and others require a plurality such as block 3.

Referring to FIG. 3, it will be noticed that the first block at the top of the page entitled 'Initialize System' contains no specific reference symbol as this includes the various operations which an operator would be required to perform before the system is placed in operation and put on stream, either in a communication environment or internally to a computing system. The initialization operations would include setting the mode switches to determine whether or not block encipherment or stream encipherment is to occur and similarly the operator sets the encode/decode switch also in the hardware. The operator must also load the two user supplied keys into the storage units 3 and 4 on FIG. 2, the contents of which are ultimately gated into the two key shift registers 8 and 11 as appropriate. Assuming that the operations required of the initialization step have been performed the system proceeds normally to block 0. This block asks the question is there a "message present". To do this the microprogram sequence starts from the read only memory 22 and causes input port 1 of the input of the IMPX 20 to be addressed or energized. As will be noted this is the EOM line. As soon as a message is present this line will have a 1 thereon and at the end of a message the line will fall to zero. As soon as the 1 is present at input port 1 to the IMPX 20, the system continues to block 1.

In block 1 the next control word energizes the "load KSR-1" line which causes the user supplied key-1 to be loaded from storage device 4 into the KSR-1 shift register 11. The system then proceeds to block 2, this time the mode setting of switch one, SW 1, is tested by interrogating input port 0 of the IMPX 20. As will be noted in referring to FIG. 2 the mode control switch, SW 1, will be connected to a zero signal going in the block cipher mode into a 1 signal in the stream cipher mode. Thus, the operational sequence charts indicate that if the output of the IMPX 20 is 0 the system branches to block 8 which is the block encipherment mode or if a 1, the system continues to block 3.

Assuming that the system continues to block 3, the operations required to achieve the loading of the Main Shift Register with key-2, as well as set up a number of additional system control lines, which control the sequential operation of the stream encipherment mode are as follows. First the 'load KSR 2' line from ROM 22 is activated which causes the user supplied key-2 to be input into the KSR-2 shift register 8 from the storage device 3. Next the operation counter 25 is loaded with the number 63 from the ROM 22. Next the MSR multiplexer 10 input port 0 is selected by the ROM 22, the SL/SR line going into the bottom of the key-1 shift register is set to a 1, which will cause the register to shift to the right. Next, the output of the control pulse mask network 26 is set by the output from the control word in the read only memory 22 such that the "shift MSR" line, the "shift KSR 2" line and the "count to zero" line is activated. The IMPX 20 input port 3 is activated again by the control word from the read only memory 22. For each clock pulse fed to the counter, a pulse is fed out of the Control Pulse Mask Network to the MSR and to the KSR 2 to shift said items one bit position. After 64 pulses have caused the counter to reach zero, the registers (MSR and KSR 2) will have been sequentially shifted 64 times. The state control counter network 21 is set so that as soon as the input 3 to the IMPX 20 becomes 1, it causes the state counter to increment and begin the next control sequence as required by block 4 of FIG. 3.

Block 4 states that the destination field of the MSR is to be loaded. In order to do this the "load MSR DF" line from the control mask network 26 becomes active. This input line into the lower left-hand corner of the MSR is brought up. As will be apparent to those skilled in the art, what this accomplishes is to gate the current contents of fields A and B of the MSR into the two substitution boxes 12 and 13. At the same time the permutation control line from the key-1 shift register 11 is activated to a 1 or a 0, and depending upon this setting, a permutation will occur in the two permutation control multiplexers 15 and 19 under control of the permutation control line. Thus, assuming the bit of key-1 is a 0, the contents of substitution box SF-1 would pass through multiplexer 15, modulo-2, and adder 16, where it is combined with the prior contents of field C and ultimately passes into field C as the destination field of the MSR. Similarly, field A would pass through substitution block 12 through multiplexer 19, and modulo-2 adder 17 where it is combined with the prior contents of field D of the MSR and this combined output would be resident finally in field D of the MSR. As stated all of the control connections are physically built into the disclosed system, the only command required actually is the occurrence of the "load MSR DF" pulse into MSR from the control pulse mask network 26.

The system then proceeds to block 5. At this point the control microprogram causes the SL/SR line to be set to 1, i.e., shift right and also sets the MSR input multiplexer port to 3 so that the output for MSR is end-around connected back to its input as will be apparent from an examination of FIG. 2. Next a "shift MSR" pulse is produced from the output of the control pulse mask network 26 which is then applied to MSR and an output pulse is produced from the MSR which passes back through the input multiplexer 10 for the MSR and also proceeds to the modulo-2 adder 18. Concurrently with the arrival of the output pulse from the MSR a data pulse is applied through AND circuit 7 as a second input to the modulo-2 adder 18 and the output is the stream cipher output from the system.

It will be noticed that since this is the stream mode, AND circuit 27 is not enabled and there is no input at the bottom of modulo 2 adder 18. The synchronization of the first data pulse with the first MSR output pulse is assumed. It could be readily achieved such as by storing the input data stream on a temporary storage tape, magnetic memory or some other convenient storage medium within the skill of a person knowledgeable in the art.

The system then continues to block 6, which again sets the SL/SR line equal to 1, (i.e., a right shift) and "shift KSR 1" line from the control pulse mask network 26 is activated causing the key-1 shift register 11 to be shifted one position and thus bring a new key-1 bit into the view of the permutation control line.

As anticipated in the present embodiment the key shift register 11 is illustrated and described as a simple end-around shift register, however, it will be appreciated that a great deal of convolutional logic could be built into such a shift register.

The system then proceeds to block 7 where a check is made to determine if the end of the message has occurred, thus, the system can stop operating. This is done by again setting IMPX 20 input address to 1. If the EOM line is still on 1, it means that there is still a message present on the input line and the system will branch back to block 4 and blocks 4, 5, 6, and 7 will be repeated iteratively until the EOM line is set to a 0. When this occurs it means that the end of the message has occurred and the system then goes to label A or back to a standby condition where it will wait for the next message to be received (Block 0).

This completes the description of the stream encipherment mode. It will be noted that the cipher/decipher switch SW-2 need never be interrogated in this mode. This is because regardless of encipherment or decipherment the same pseudo-random number stream will be produced by the present system and will always provide the identical input to the modulo-2 adder 18. It will readily be appreciated that after a first modulo-2 addition with a known binary stream, with a second known bianary stream, that a resultant third binary stream will be produced by such an adder. In order to then produce one of the original binary streams it is only necessary to have the combined output and one of the originals. In the present instance the pseudo-random number output stream from the MSR is duplicated at the receiving end and by producing this pseudo-random number stream and mixing or decoding in the modulo-2 adder 18 with the encoded data stream, the original clear-text binary stream is produced. Thus, in the stream mode of operation, encipherment and decipherment operations are essentially identical. The only difference is that in the encipherment case the received message is clear and in the decipherment case the received message would have been previously enciphered or be 'ciphertext'.

Assuming now that the test made in block 2 of the flow chart of FIG. 3 had indicated that a block mode encipherment operation was to occur, the system branches to block 8 on FIG. 4. Block 8 causes the following operations to occur. The IMPX 20 input port 2 is activated and a determination is made as to whether the system is working in an encipher or decipher mode. If the switch SW 2 is set to 0 (decipher), then the system would branch via the state counter control network 21, to block 18. If on the other hand the SW 2 line is set to a 1, this means the system is to perform an encipherment mode operation and will continue to block 9. In the present instance this latter situation will be assumed. In block 9 a signal is produced from ROM 22 to activate the "load KSR2" line from the control pulse mask network 26, which causes key-2 to be loaded in parallel into the key-2 shift register 8. The system then proceeds to block 10 wherein the asterisk denotes the concurrent loading and unloading of MSR. What occurs during this block is the complete unloading of the MSR, as processed output. It will be noted that it merely passes through the modulo-2, adder 18 in unaltered form since there is no output at either the top or bottom input to the adder, only the input from the MSR. Simultaneously, new data is fed into the MSR which is the modulo-2 addition of the 64 bit key stored in the key-2 shift register 8 and 64 bits of a new message block both of which are fed through the modulo-2 adder 9, passed through the input port 1 of the MSR multiplexer 10, and on into the MSR. The specific hardware which is activated to accomplish this action is as follows. The operation counter 25 is set to 63 via BUS A from the ROM 22. The microprogram control sequence causes the following hardware settings. The MSR multiplexer address is set to (1) as stated previously, and the IMPX 20 input is set to (3) to detect when the operation counter is returned to 0. The control pulse mask network 26 is set to enable the "shift MSR" line and the "shift KSR-2" line so that these two lines will receive the clock pulses (CP) as produced by the clock 24. Finally the state counter control network 21 and state counter are set so that when the input to the port (3) of IMPX 20 returns to a 0, the system will continue to block 11. What happens now is that as the system clock runs for a total of 64 total pulses, the MSR will be concurrently emptied at the one and loaded at the other, and when the final bit shift occurs, the operation counter will have been reset to 0, to produce an appropriate signal at port (3) of the IMPX 20. This causes the system to continue to block 11.

Block 11, simply resets the operation counter to 63, via BUS A, however, this time the operations counter will control 64 cycles of cryptographic transformation of the block data and key currently stored in the MSR. Block 11 then proceeds to block 12 wherein a signal appears on the "load MSR DF" output line from the control pulse mask network 26. This operation is now identical to that of the previously described stream-mode operation which causes the contents of source fields A and B of the MSR to be gated through the substitution devices SF-0 and SF-1 and then through the two multiplexers 15 and 19, the modulo-2 adders 16 and 17 and finally into the two destination fields C and D. It will similarly be remembered that the two multiplexers 15 and 19 are controlled by the setting of the permutation control line emanating from the key-1 shift register 11. Depending on the setting of this line, the output of the two substitution devices 12 and 13 will pass through one or the other of the input ports of the multiplexers 15 and 19 to be subsequently combined in the modulo-2 adders with the prior contents of the destination fields C and D of the MSR. This operation will occur within one system cycle or clock pulse produced by the system clock 24, and upon completion, the system continues to block 13.

What occurs in block 13 is a rolling or shifting of the MSR and the key-1 shift register 11. This is prior to the next encryption round so that new data is presented for both the permutation control and also for the primary cryptographic transformation. To do this the SL/SR line is set to 1 so that both registers will be shifted in the same direction, i.e., to the right, and the MSR multiplexer 10 address is set to (3) to allow for end-around shifting of the MSR, and finally, the "shift MSR" and "shift KSR-1" lines from the output of the control pulse mask network 26, are activated so that the next clock pulse causes the actual single shift of these two registers.

At this point the system proceeds to block 14 where a test is made of the operation counter to see if all of the required cycles of encryption, (i.e. 64) have been completed. To do this the IMPX 20 address is set to (3) and the condition of the operation counter reset to 0. Its output line would automatically be set to a 1, which would mean that all of the necessary rounds of encryption had been completed and the system would go to block 16, if not the input to the multiplexer 20 (at port 3) would remain at 0 and the system would continue to block 15.

Block 15 causes the operation counter 25 to be decremented via the appropriate output lines from control pulse mask network 26 and proceed back to block 12, wherein the current contents of the MSR are again cryptographically transformed as described previously with respect to blocks 12 and 13. This loop consisting of blocks 12, 13, 14, and 15, continues until it is determined that the operation counter has been ultimately reset to 0, at which point the system proceeds to block 16. Block 16 tests to see if this is the last member or block of the input message or whether there is still more message to be encrypted or decrypted. This is done by setting the IMPX 20 address to 1 which tests the condition of EOM line. It will again be remembered that the EOM line will be set at 0 as long as a message still exists and will go to a 1 when the end of message (EOM) signal is received. Assuming that there are still further message blocks to be decoded the system would return to block 9 of the flow chart and the ensuing sequences would be repeated until all blocks of data have been successfully enciphered or deciphered.

If on the other hand the EOM line is set to a 1, the system will continue to block 17. At this point essentially half of the operation which occurred in block 10 is repeated, namely the MSR is unloaded as this is the last block of the encoded message. To accomplish this the operation counter is again loaded with the number 63 via BUS A from the ROM 22. The SL/SR line is set to 1 and the "shift MSR" line from the control pulse mask network 26 is activated. The IMPX 20 address is set to (3) and the state counter control network is set to increment the state counter 23 to branch back to block 0 upon exit from block 17. At this point the system clock 24 pulses (CP) cause the MSR to be shifted to the right to place this last block of enciphered data on the 'processed output' line, and when 64 such shifts have occurred the output from the operation counter changes from a 0 to a 1, which as stated previously, causes the instruction sequence to branch back to the standby or initialization state represented by block 0.

This completes the description of the encipherment half of the block cipher mode of operation. What will be described next is the decipherment mode which will be remembered is a test made back in block 8 which causes clock 18 of the flow chart to be entered.

It will be remembered from the above paragraph that block 18 is the initial step or phase of a deciphering operation. At this point it should be recalled that the enciphered block of data which is being received as the input message was combined with the user supplied key-2 from the key-2 shift register 8 prior to the cryptographic transformations. Thus, what must occur during decryption is that this input message must be placed directly into the MSR without the modulo-2 combination with the key-2 till a complete set of decryption has occurred and finally the output of the partially cryptographically deciphered block of data passes through the modulo-2 adder 18 where it is modulo-2 combined with key-2 via AND circuit 27 to produce the final deciphered stream.

In order to gate the incoming encrypted message blocks directly into the MSR, port (2) of the MSR multiplexer 10 is energized. The SL/SR line is set to 1 since this is to be simply a loading operation and encryption is not involved as will be explained later. The operation counter 25 is again set to 63 via BUS A from ROM 22. The "shift MSR" line of the control pulse mask network 26 is activated and the IMPX 20 port (3) is addressed to monitor the condition (i.e. 0) of the operation counter 25. The state counter control network 21 is set so that when the output from the input multiplexer equals 1, the state counter will be incremented, thus, the system will continue to block 19. As will be remembered at this point with the present controls set, the clock pulses from the system clock 24 consecutively pass through the control pulse mask network to cause 64 bits of input message, which is to be decrypted, to be loaded into the MSR. This loading operation is continuously monitored by the operation counter 25 and thus the state counter control network 21 is activated when the operation counter goes to 0 so that its output line raises to a 1 which will cause the next instruction to be accessed from the ROM 22 which brings the system to block 19 of the flow charts.

A block of encrypted data is currently sitting in the MSR and is waiting to be cryptographically transformed (decoded). At this point the encryption and decryption sequence of operations is identical with the exception of the fact that the MSR is shifted in the opposite direction, i.e., to the left, and the key-1 shift register 11 is similarly shifted to the left instead of to the right between transformation cycles. The loading of the destination fields, of the MSR, i.e., destination fields C and D from source fields A and B, is identical in that fields A and B pass through the two substitution boxes 12 (SF0) and 13 (SF1), the multiplexers 15 and 19 under control of the permutation control line and thence through the modulo-2 adders 16 and 17 into the ultimate destination fields C and D. Subsequent to each such transformation a new shift to the left occurs. Thus, blocks 20 and 21 are identical to blocks 13 and 12 respectively of the encipherment mode with the exception that the shift direction is the opposite and as will be noted blocks 20 and 21 are in effect inverted with respect to blocks 12 and 13. This as will be apparent cryptographically reverses or inverts the encryption operation. Block 22 is identical to block 14 in that it tests the setting of the operation counter to determine whether the necessary decryption cycles (64) have been completed. If not the operation counter is decremented and blocks 20 and 21 are repeated and again the test is made in block 22.

A specific description of the hardware operations performed by blocks 20, 21, 22, and 23 will not be repeated here as they are essentially identical to those performed by blocks 12, 13, 14, and 15 just described previously. The actual operations which occur in these blocks clearly set forth in operational sequence charts.

Assume the system has now continued to block 24. At this point the control pulse mask network 26 enables the "load KSR-2" line thus causing the user supplied key-2 to be loaded into key-2 shift register 8. The end of block 24 proceeds to block 25, wherein, two operations in the MSR occur simultaneously, that is the outputting of the contents of the MSR and the loading of a new block of enciphered data (if one is present, which is determined in block 26). It will be noted from the formula in block 25 that the outputting operation is accompanied by a modulo-2 addition of the contents of the MSR and the user supplied key-2 which, modulo addition occurs in box 18. The output from the MSR enters modulo-2 adder 18 directly from the left and key-2 is sequentially gated in synchronism with said MSR data through AND circuit 27 to the bottom input of block 18. This final modulo-2 addition completes the decryption operation which, as will be remembered, is the cryptographic and mathematical inverse of the encryption operation which will thus produce the correct decoded message as the 'processed output' from the system.

Specifically block 25 requires the following operations to occur. The operation counter 25 is again loaded with the number 63 via BUS A, from the ROM 22. Concurrently, the MSR input multiplexer port (2) is enabled and the input port (3), of the IMPX 20 is enabled to allow monitoring of the operation counter 25. The MSR multiplexer input port is set to (2) to provide for the direct gating of the encrypted data into the MSR if there is in fact a block of data on the input message line at this time. The AND 27 Enable line is set to a 1 to open gage 27 to allow the appropriate gating of key-2 data therethrough and the SL/SR line is set to a 1 so that the MSR maybe unloaded through modulo-2 adder 18. The state counter control network 21 is set so that upon the occurrence of a 1 from the output from the output of the the IMPX 20 the system will proceed to block 26. Thus the MSR is concurrently loaded and unloaded under control of the system clock via 64 consecutive pulses therefrom, until the completed state of the operation counter indicates that block 26 is to be entered.

At this point a test is made to see if the last block of data has been decrypted. In order to do this the EOM line is tested by addressing port (1), of the IMPX 20. If the EOM line is set to a 1 it means that there is still message data present, and the state counter control network 21 causes the system to branch back to block 19 which will cause a new block decryption round to occur. If on the other hand EOM line is set to 0 the state counter control network 21 causes the state counter 23 to be incremented to return the system back to flag A which returns the system to block 0 which is the waiting or standby condition.

This completes the description of the detailed operation of the present stream/block cipher cryptographic system. From the above description the complete versatility of the present system will be apparent, especially the use of the function of the various hardware components during the various modes of system operations in an almost identical manner.

STREAM/BLOCK CRYPTOGRAPHIC SYSTEM
OPERATIONAL SEQUENCE CHARTS

| Flow Chart Label | Operation Performed |
|---|---|
| 0 | SET: *IMPX ADDRESS=1<br>WHEN IMPX→1, CONTINUE |
| 1 | LOAD KSR 1 |
| 2 | SET: *IMPX ADDRESS=0<br>IF IMPX=0, GO TO LABEL B→(BLOCK 8)<br>IF IMPX=1, CONTINUE→TO BLOCK 3<br>Stream Mode Operations |
| 3 | LOAD KSR2<br>LOAD OPNCTR (BUS A=63)<br>SET: *MSR MPX ADDRESS=0<br>    *SL/SR=1 |

-continued

STREAM/BLOCK CRYPTOGRAPHIC SYSTEM OPERATIONAL SEQUENCE CHARTS

| Flow Chart Label | Operation Performed |
|---|---|
| | *CONTROL PULSE MASK to enable SHIFT MSR, SHIFT KSR2, and COUNT TO ZERO<br>*IMPX ADDRESS=3<br>*STATE TRANSITION CONTROL such that when IMPX→1, CONTINUE (TO BLOCK 4) |
| 4.......... | LOAD MSRDF |
| 5.......... | SET: *SL/SR=1<br>*MSR MPX ADDRESS=3<br>SHIFT MSR |
| 6.......... | SET: *SL/SR=1<br>SHIFT KSR1 |
| 7.......... | SET: *IMPX ADDRESS =1<br>IF IMPX=0, GO TO LABEL A (end)<br>IF IMPX=1, GO TO BLOCK 4<br>Block Mode Operations |
| 8.......... | SET: *IMPX ADDRESS=2<br>IF IMPX=0, GO TO LABEL 18<br>IF IMPX=1, CONTINUE |
| 9.......... | LOAD KSR2 |
| 10.......... | LOAD OPNCTR with 63 via BUS A<br>SET: *MSR MPX ADDRESS=1<br>*IMPX ADDRESS=3<br>*CONTROL PULSE MASK to enable SHIFT MSR and SHIFT KSR2<br>*STATE COUNTER CONTROL NETWORK such that when IMPX→1, CONTINUE (TO LABEL 11)<br>COUNT TO ZERO |
| 11.......... | LOAD OPNCTR with 63 via BUS A |
| 12.......... | LOAD MSRDF |
| 13.......... | SET: *SL/SR=1<br>MSR MPX ADDRESS=3<br>SHIFT MSR and SHIFT KSR1 |
| 14.......... | SET: *IMPX ADDRESS=3<br>IF IMPX=1, GO TO BLOCK 16<br>IF IMPX=0, CONTINUE |
| 15.......... | DECR OPNCTR<br>GO TO BLOCK 12 |
| 16.......... | SET: *IMPX ADDRESS=1<br>IF IMPX=0, GO TO BLOCK 9<br>IF IMPX=1, CONTINUE to BLOCK 17 |
| 17.......... | LOAD OPNCTR (BUS A=63)<br>SET: *SL/SR=1<br>*CONTROL PULSE MASK TO ENABLE SHIFT MSR<br>*STATE COUNTER CONTROL NETWORK such that when IMPX→1, GO TO LABEL 0<br>*IMPX ADDRESS=3<br>COUNT TO ZERO |
| 18.......... | LOAD OPNCTR (BUS A=63)<br>SET: *SL/SR=1<br>*MSR MPX ADDRESS=2<br>*CONTROL PULSE MASK TO ENABLE SHIFT MSR<br>*IMPX ADDRESS=3<br>*STATE COUNTER CONTROL NETWORK such that when IMPX→1, CONTINUE (to BLOCK 19)<br>COUNT TO ZERO |
| 19.......... | LOAD OPNCTR to 63 via BUS A |
| 20.......... | SET: *MSR MPX ADDRESS=3<br>*SL/SR=0<br>SET CONTROL PULSE MASK TO ENABLE SHIFT MSR and SHIFT KSR1 |
| 21.......... | SET CONTROL PULSE MASK TO ENABLE LOAD MSRDF |
| 22.......... | SET: *IMPX ADDRESS=3<br>IF IMPX=1, GO TO LABEL 4<br>IF IMPX=0, CONTINUE |
| 23.......... | SET CONTROL PULSE MASK TO ENABLE DECR OPNCTR<br>GO TO LABEL 20 |
| 24.......... | SET CONTROL PULSE MASK TO ENABLE LOAD KSR2 |
| 25.......... | LOAD OPNCTR to 63 via BUS A<br>SET: *MSR MPX ADDRESS=2<br>*IMPX ADDRESS=3<br>*A27 ENABLE=1<br>*SL/SR=1<br>*STATE COUNTER CONTROL NETWORK such that when IMPX=1, CONTINUE (to BLOCK 26) |
| 26.......... | SET: *IMPX ADDRESS=1<br>IF IMPX=1, GO TO BLOCK 19<br>IF IMPX=0, Means "END OF MESSAGE" return to BLOCK 0 |

| STREAM/BLOCK CRYPTOGRAPHIC SYSTEM OPERATIONAL SEQUENCE CHARTS ||
|---|---|
| Flow Chart Label | Operation Performed |
| GO TO LABEL 0 | |

CONCLUSIONS

It should be readily understood that while the presently disclosed system represents what is 'considered' to be the preferred hardware embodiment for practicing the invention, that nevertheless many variations of the basic concepts are possible.

For example, the user supplied key referred to herein as key-2 could be many multiples of 64 bits and be sequentially applied as required, which would obviously produce a further level of security to the system.

Similarly, the specific configuration of the transformations utilized in the Transformation Element could take on many variations still under control of the key, referred to herein as user supplied key-1. More than two transpositions matrices or permutation boxes could be used, and similarly more than two substitution blocks could readily be utilized.

Additionally, the details of the control subsystem could vary quite widely and a number of the loading operations could be changed from serial to parallel to save time at an attendant cost in hardware.

However, the underlying concept of utilizing essentially the same hardware to generate a pseudo-random number stream for use as a stream cryptographic system or as a rather complex block cryptographic system is considered to be basically unique.

While the invention has been disclosed and described with respect to the herein disclosed embodiment as well as the above suggested changes, it will be apparent that still other and different modifications to the system could be made within the spirit and scope of the invention.

What is claimed is:

1. A key-controlled cryptographic system capable of selectively performing stream or block mode cryptographic transformations on an incoming data set, said system including means for storing a user supplied key, means for entering said data set into said system for cryptographic transformation, a main reconfiguration means comprising a shift register whose input is a function of said user supplied key, a transformation element operatively connected to said main reconfiguration means for cryptographically transforming data located in said main reconfiguration means, means for causing said transformation element to perform consecutive cryptographic transformations of data located in said main reconfiguration means for a predetermined number of cycles, means for selectively utilizing the complete contents of said main reconfiguration means as a full cryptographically transformed block of data in block mode operation, or a pseudo-random number stream which is combined serially in an inverse mathematical function with said incoming data set in serial mode operation.

2. A key-controlled cryptographic system as set forth in claim 1 wherein said transformation element is connected to said main reconfiguration means and includes means for extracting data from a first portion thereof, cryptographically transforming same and returning said transformed data to said main reconfiguration means in a transformed version and wherein said main reconfiguration means may be selectively shifted to itself reconfigure the contents thereof.

3. A cryptographic system as set forth in claim 2 wherein said transformation element further means for returning said cryptographically transformed data to said main reconfiguration means at a second location therein and, concurrently combining said cryptographically transformed data with the data currently in said second location in a linear transformation.

4. A cryptographic system as set forth in claim 2 wherein said non-affine transformation device comprises a substitution device which operates as a data dependent mapping table.

5. A cryptographic system as set forth in claim 4 wherein said transformation element further includes a permutation means including means for transposing, as a function of said user supplied key, bits returned to said main reconfiguration means by the transformation element.

6. A cryptographic system as set forth in claim 5 including means for storing a first and second user supplied binary key, means for loading the main reconfiguration means as a function of one of said keys and means for controlling the permutaion operation in the transformation element as a function of the other of said keys.

7. A cryptographic system as set forth in claim 6 including means operable during stream encipherment mode for causing said shift register to be sequentially shifted in a circular mode and wherein a selected bit is extracted on each shift operation to form a series of output bits which is used as a pseudo-random number stream and means for causing a cryptographic transformation to be performed in cooperation with said transformation element between each shift cycle.

8. A cryptographic system as set forth in claim 7 including a modulo-2 adder for combining said pseudo-random number stream with said incoming data set to be cryptographically transformed and wherein the output of said modulo-2 adder comprises said cryptographically transformed data stream.

9. A cryptographic system as set forth in claim 6 including means for initially loading said main reconfiguration means during encoding operations with a block of data to be cryptographically transformed as a function of said block of data and said user supplied key and means to effect a predetermined number of cryptographic transformation cycles within said main reconfiguration means and said transformation element to effect a complete block transformation operation.

10. A cryptographic system as set forth in claim 9 wherein said main reconfiguration means is initially loaded as a modulo-2 function of the combination of said incoming data and said user supplied key.

11. A key-controlled cryptographic system capable of selectively performing stream or block cryptographic transformations on an incoming data set, said system including means for accepting and storing two user supplied binary keys, means for entering said data set into said system in stream or block form depending upon the cryptographic transformation mode being utilized, a main reconfiguration means comprising a shift register and including means for loading said main reconfiguration means with data whose input is a function of one of said user supplied keys, a transformation element operatively connected to said main reconfiguration means including means for extracting data from a source field of said main reconfiguration means, performing a nonaffine transformation thereon and returning same to a destination field in said main reconfiguration means through a permutation means controlled by the other of said user supplied keys, means actuable to cause said transformation element to interact with said main reconfiguration means to perform the aforementioned transformations each time said main reconfiguration means is shifted a bit position, means for selectively utilizing the output of said main reconfiguration means as a full cryptographically transformed block of data in the block mode of operation or a pseudo-random number stream which is to be cryptographically combined with said incoming data set when in the stream mode of operation.

12. A key-controlled cryptographic system as set forth in claim 11 including modulo-2 adder means and means for combining the contents of the current destination field of said main reconfiguration means with the output of said permutation means and storing the result of the modulo-2 adder sum as the new content of the destination field of said main reconfiguration means.

13. A key-controlled cryptographic system as set forth in claim 12 including means operable during stream mode operation whereby the output of a predetermined bit position of said main reconfiguration means is utilized as the output random number bit stream to be combined with said incoming data set and further including modulo-2 adder means for combining said pseudo-random number bit stream with said incoming data set to produce a cryptographically transformed data stream output, said system including control means whereby the cryptographic system operates identically whether encrypting or decrypting an incoming data stream.

14. A key-controlled cryptographic system as set forth in claim 13 including means operable during block cipher mode operations to cause said main reconfiguration means and said transformation element to successively transform the content of the main reconfiguration means a predetermined number of times before a complete cryptographic transformation is finished and including means for initially loading said main reconfiguration means with an incoming data set as a modulo-2 sum addition with said one user supplied key during an encryption operation and means for loading said incoming data set directly into the main reconfiguration means during a decryption operation and combining the cryptographically transformed data block output from said main reconfiguration means with the said user supplied key as a modulo-2 sum addition as the final cryptographic transformation upon said data block.

* * * * *